United States Patent
Boger et al.

(10) Patent No.: US 10,632,458 B2
(45) Date of Patent: Apr. 28, 2020

(54) COMPOUND HONEYCOMB BODY, EXHAUST GAS TREATMENT ARTICLE, EXHAUST SYSTEM AND METHODS OF MANUFACTURING SAME

(71) Applicant: Corning Incorporated, Corning, NY (US)

(72) Inventors: Thorsten Rolf Boger, Bad Camberg (DE); Willard Ashton Cutler, Elmira, NY (US); Ameya Joshi, Horseheads, NY (US); Kunal Upendra Sakekar, Maharashtra (IN)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/777,085

(22) PCT Filed: Nov. 29, 2016

(86) PCT No.: PCT/US2016/063895
§ 371 (c)(1),
(2) Date: May 17, 2018

(87) PCT Pub. No.: WO2017/095762
PCT Pub. Date: Jun. 8, 2017

(65) Prior Publication Data
US 2019/0054456 A1     Feb. 21, 2019

Related U.S. Application Data

(60) Provisional application No. 62/260,847, filed on Nov. 30, 2015.

(51) Int. Cl.
*B01J 35/04* (2006.01)
*B01D 46/24* (2006.01)
(Continued)

(52) U.S. Cl.
CPC .......... *B01J 35/04* (2013.01); *B01D 46/2429* (2013.01); *B01D 53/94* (2013.01); *B01J 35/0006* (2013.01);
(Continued)

(58) Field of Classification Search
CPC ....... B01J 35/04; B01J 35/0006; B01D 53/94; F01N 3/2828
(Continued)

(56) References Cited

U.S. PATENT DOCUMENTS 6,087,298 A * 7/2000 Sung ................... B01D 53/945
                                                                502/333
7,655,195 B1   2/2010 Ichikawa et al.
(Continued)

FOREIGN PATENT DOCUMENTS

EP    1375849 B1    3/2010
JP    2009228618 A  10/2009

OTHER PUBLICATIONS

International Search Report and Written Opinion of the International Searching Authority; PCT/US2016/063895; dated May 2, 2017; 13 Pages; European Patent Office.
(Continued)

*Primary Examiner* — Tom P Duong (57) ABSTRACT

A compound honeycomb body comprising a first honeycomb section having a volume V1 and a second honeycomb section fluidly connected to the first honeycomb having a volume V2 is provided. The first honeycomb section comprises a low mass high porosity porous ceramic substrate. The second honeycomb section comprises a standard porous ceramic substrate. Wherein V1/V2 comprises a ratio in a range from about 50/50 to about 10/90.

26 Claims, 6 Drawing Sheets

(51) Int. Cl.
   *B01D 53/94*    (2006.01)
   *B01J 35/00*    (2006.01)
   *F01N 3/28*     (2006.01)
   *B01D 46/00*    (2006.01)

(52) U.S. Cl.
   CPC ........ *F01N 3/2828* (2013.01); *B01D 46/0024* (2013.01); *B01D 2046/2433* (2013.01)

(58) Field of Classification Search
   USPC .................................... 422/177, 180; 55/523
   See application file for complete search history.

(56) References Cited

U.S. PATENT DOCUMENTS

| | | |
|---|---|---|
| 8,137,637 B2 | 3/2012 | Kohli |
| 2008/0190083 A1 | 8/2008 | Oshimi |
| 2010/0062212 A1 | 3/2010 | Weissman et al. |
| 2010/0124519 A1 | 5/2010 | Kohli |
| 2011/0237428 A1 | 9/2011 | Itou et al. |
| 2017/0082005 A1* | 3/2017 | Aoki ................. B01D 46/2429 |
| 2017/0369218 A1 | 12/2017 | Bookbinder et al. |
| 2018/0073410 A1 | 3/2018 | Bookbinder et al. |
| 2018/0135491 A1 | 5/2018 | Bookbinder et al. |

OTHER PUBLICATIONS

English Translation of JP2018527949 Office Action dated Apr. 17, 2019; 6 pages; Japanese Patent Office.
Chinese Patent Application No. 201680070047.2; English Translation of the First Office Action dated Oct. 28, 2019; China Patent Office; 12 pgs.
Japanese Patent Application No. 2018527949; Notice of Allowance dated Nov. 20, 2019; Japan Patent Office; 3 pgs. (machine translation attached).
Indian Patent Application No. 201817020279; First Examination Report dated Oct. 24, 2019; India Patent Office; 6 pgs.

* cited by examiner

COMPOUND HONEYCOMB BODY, EXHAUST GAS TREATMENT ARTICLE, EXHAUST SYSTEM AND METHODS OF MANUFACTURING SAME

CROSS-REFERENCE TO RELATED APPLICATIONS

This application is a national stage application under 35 U.S.C. § 371 of International Patent Application Serial No. PCT/US2016/063895, filed on Nov. 29, 2016, which claims the benefit of priority of U.S. Provisional Application Ser. No. 62/260,847, filed on Nov. 30, 2015, the contents of which are relied upon and incorporated herein by reference in their entireties.

BACKGROUND

Field

Exemplary embodiments of the present disclosure relate to a compound honeycomb body, an exhaust gas treatment article comprised thereof, an exhaust system comprised thereof, and methods of manufacturing the same and, more particularly, to a compound honeycomb body comprising a first honeycomb section and a second honeycomb section, an exhaust gas treatment article comprising the honeycomb body sections disposed in a housing, an exhaust system comprising the exhaust gas treatment article, and methods of manufacturing the same.

Discussion of the Background

After-treatment of exhaust gas from internal combustion engines may use catalysts supported on high-surface area substrates and, in the case of diesel engines and some gasoline direct injection engines, a catalyzed or non-catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a compound honeycomb body having a first honeycomb section and a second honeycomb section.

Exemplary embodiments of the present disclosure also provide an exhaust gas treatment article having the compound honeycomb body.

Exemplary embodiments of the present disclosure also provide an exhaust system having the exhaust gas treatment article.

Additional features of the disclosure will be set forth in the description which follows, and in part will be apparent from the description, or may be learned by practice of the disclosure.

An exemplary embodiment discloses a compound honeycomb body comprising a first honeycomb section extending axially a distance L1 and a second honeycomb section fluidly connected to the first honeycomb section extending a distance L2. The first honeycomb section comprises a plurality of porous ceramic channel walls extending axially from opposing first and second end faces defining cell channels therebetween, and an outer peripheral surface extending axially. The second honeycomb section comprises a plurality of porous ceramic channel walls extending axially from opposing first and second end faces defining cell channels therebetween, and an outer peripheral surface extending axially. The second honeycomb section comprises a thermal mass greater than the thermal mass of the first honeycomb section. Wherein L1/L2 comprises a ratio in a range from about 50/50 to about 10/90.

An exemplary embodiment discloses a compound honeycomb body comprising a first honeycomb section having a volume V1 and a second honeycomb section having a volume V2 fluidly connected with the first honeycomb section. The first honeycomb section comprises a plurality of porous ceramic channel walls extending axially from opposing first and second end faces defining cell channels therebetween, and an outer peripheral surface extending axially. The first honeycomb section comprises a thermal mass less than the second honeycomb section. The second honeycomb section comprises a plurality of porous ceramic channel walls extending axially from opposing first and second end faces defining cell channels therebetween, and an outer peripheral surface extending axially. Wherein V1/V2 comprises a ratio in a range from about 50/50 to about 10/90.

Another exemplary embodiment discloses an exhaust gas treatment article. The exhaust gas treatment article comprises a compound honeycomb body and a housing configured to mount the compound honeycomb body. The compound honeycomb body comprising a first honeycomb section having a volume V1 and a second honeycomb section fluidly connected to the first honeycomb section having a volume V2. The first honeycomb section comprises a plurality of porous ceramic channel walls extending axially from opposing first and second end faces defining cell channels therebetween, and an outer peripheral surface extending axially. The second honeycomb section comprises a plurality of porous ceramic channel walls extending axially from opposing first and second end faces defining cell channels therebetween, and an outer peripheral surface extending axially. The second honeycomb section comprises a thermal mass greater than the thermal mass of the first honeycomb section. Wherein V1/V2 comprises a ratio in a range from about 50/50 to about 10/90, wherein the compound honeycomb body is disposed in a space defined by an inner surface of the housing.

Another exemplary embodiment discloses an exhaust system. The exhaust system comprises an inlet configured to accept an exhaust gas stream to be purified, an exhaust gas treatment article configured to flow the exhaust gas stream through a compound honeycomb body to purify the exhaust gas stream, and an outlet configured to emit the purified exhaust gas stream. The exhaust gas treatment article comprises a compound honeycomb body and a housing configured to mount the compound honeycomb body. The compound honeycomb body comprising a first honeycomb section extending axially a distance L1 and a second honeycomb section fluidly connected to the first honeycomb section extending a distance L2. The first honeycomb section comprises a plurality of porous ceramic channel walls extending axially from opposing first and second end faces defining cell channels therebetween, and an outer peripheral surface extending axially. The first honeycomb section comprises a porosity (% P) of the porous ceramic channel walls greater than or equal to 40%. The second honeycomb section comprises a plurality of porous ceramic channel walls extending axially from opposing first and second end faces defining cell channels therebetween, and an outer peripheral surface extending axially. The second honeycomb section comprises a porosity (% P) of the porous ceramic channel walls less than 40%. Wherein L1/L2 comprises a ratio in a range from about 50/50 to about 10/90, wherein the compound honeycomb body is disposed in a space defined by an inner surface of the housing.

An exemplary embodiment also discloses a method of manufacturing an exhaust gas treatment article. The method comprises mounting the compound honeycomb body in the housing configured to hold the compound honeycomb body in an exhaust gas stream. The compound honeycomb body comprising a first honeycomb section extending axially a distance L1 and a second honeycomb section fluidly connected to the first honeycomb section extending a distance L2. The first honeycomb section comprises a plurality of porous ceramic channel walls extending axially from opposing first and second end faces defining cell channels therebetween, and an outer peripheral surface extending axially. The first honeycomb section comprises a porosity (% P) of the porous ceramic channel walls greater than or equal to 40%. The second honeycomb section comprises a plurality of porous ceramic channel walls extending axially from opposing first and second end faces defining cell channels therebetween, and an outer peripheral surface extending axially. The second honeycomb section comprises a porosity (% P) of the porous ceramic channel walls less than 40%. Wherein L1/L2 comprises a ratio in a range from about 50/50 to about 10/90, wherein the compound honeycomb body is disposed in a space defined by an inner surface of the housing. The mounting comprises disposing the first honeycomb section and second honeycomb section in an inner space defined by an inner surface of the housing.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ). When describing a value in a range from A to B, it will be understood that the end points A and B are included in the range.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

Exemplary embodiments of the disclosure relate to an improved exhaust gas treatment article including a compound honeycomb body, an exhaust gas treatment system (exhaust system) comprised thereof, and methods of manufacturing the same. The compound honeycomb body comprises a first honeycomb section and a second honeycomb section, the exhaust gas treatment article can comprise the honeycomb body sections disposed in a housing, the exhaust system can comprise the exhaust gas treatment article, and methods of manufacturing the same can comprise disposing the honeycomb body sections in the housing.

When an internal combustion engine starts cold, a larger amount of unburned hydrocarbons and carbon monoxide can be emitted in the first minutes or less than when the internal combustion engine is warm. Also the larger amount of unburned hydrocarbons and carbon monoxide can pass through a cold catalyst without converting to $CO_2$, and $H_2O$. Close coupling the catalyst to the engine, for example, positioned within less than six inches (15.24 cm) of the engine exhaust manifold can reduce the un-burnt hydrocarbons (HC) and carbon monoxide (CO) by more quickly warming the catalyst. Nevertheless, cold start emissions can account for greater than 80% of the total emissions, for example, for a vehicle during a drive cycle.

After the catalyst is warmed up, after about 20-30 seconds, most of the emissions (HC, CO, NOx) get converted to $CO_2$, $H_2O$, and $N_2$ by the warm catalyst. To reduce catalyst warming time, lower mass close coupled substrates having high porosity and significantly lower density can be utilized. For example, the density can be about 30% less than standard porous ceramic honeycomb substrates having similar cell density and wall thickness. For example, when cordierite density is taken as about 2.5 $g/cm^3$, a 400/6 standard porous ceramic honeycomb substrate of cordierite can have a density of about 0.41 $g/cm^3$ with about 27 percent porosity (% P), whereas the 400/6 low mass porous ceramic honeycomb substrate of cordierite can have a density of about 0.31 $g/cm^3$ with about 45% P, a density of about 0.25 $g/cm^3$ with about 55% P, or a density of about 0.20 $g/cm^3$ with about 65% P. For example, a 600/3 standard porous ceramic honeycomb substrate of cordierite can have a density of about 0.26 $g/cm^3$ with about 27% P, whereas the 600/3 low mass porous ceramic honeycomb substrate of cordierite can have a density of about 0.20 $g/cm^3$ with about 45% P, a density of about 0.16 $g/cm^3$ with about 55% P, or a density of about 0.12 $g/cm^3$ with porosity of 65%.

For another example, when the material is an aluminum titanate composite, for example, about 70% aluminum titanate phase having a density of about 3.7 $g/cm^3$ and about 30% strontium feldspar phase having a density of about 3.0 $g/cm^3$ thus giving the composite density of about 3.5 $g/cm^3$, a 400/6 standard porous ceramic honeycomb substrate of aluminum titanate composite can have a density of about 0.57 $g/cm^3$ with about 27 percent porosity (% P), whereas the 400/6 low mass porous ceramic honeycomb substrate of aluminum titanate composite can have a density of about 0.43 $g/cm^3$ with about 45% P, a density of about 0.35 $g/cm^3$ with about 55% P, or a density of about 0.28 $g/cm^3$ with about 65% P. For example, a 600/3 standard porous ceramic honeycomb substrate of aluminum titanate composite can have a density of about 0.36 $g/cm^3$ with about 27% P, whereas the 600/3 low mass porous ceramic honeycomb substrate of aluminum titanate composite can have a density of about 0.27 $g/cm^3$ with about 45% P, a density of about 0.22 $g/cm^3$ with about 55% P, or a density of about 0.17 $g/cm^3$ with porosity of 65%. A lower mass, high porosity substrate can be end plugged to form a filter or partial filter with higher mass than the substrate when not plugged.

Having faster light-off compared to standard substrates can be provided by the lower mass substrates. These low mass high porosity substrates, referred to herein as "high-porosity substrates" can reduce engine out emissions. Testing has shown that there is nearly a 10% HC reduction using such a low mass high porosity substrate for a close coupled catalyst.

High-porosity substrates such as FLORA™ substrates offer the potential of early catalyst light-off and ultimately reduced tailpipe emissions. The high-porosity substrates can be beneficial for high-temperature applications such as gasoline thin wall catalysts for three way catalysts (TWCs). However high-porosity substrates have not been explored for low-temperature applications such as diesel oxidation catalysts (DOCs) for diesel or for modern efficient engines which have low engine-out temperatures. Modeling shows that high-porosity substrates may not be beneficial, in fact may lead to worsening cumulative emissions over a low-temperature transient drive cycle. This is driven by rapid catalyst cool-down when the exhaust gas temperature drops below the catalyst light-off temperature, referred to as light-out. High porosity substrates can cool down quickly and lead to higher emissions.

Another aspect of the exemplary embodiments of the disclosure is directed to improved pressure drop. For example, there may be an interest to move from 400 cells per square inch (cpsi) (62 cells per square cm (cpsc)) cell density and 4 mil (0.1 mm) wall (400/4) substrates to higher cell density, for example 600 cpsi (93 cpsc) cell density and 3 mil (0.08 mm) wall (600/3) substrates, for higher CO conversion. However, such a move can be accompanied by a pressure drop (PD) penalty. Exemplary embodiments of the disclosure provide a reduction in PD penalty. Another aspect of the exemplary embodiments of the disclosure provides an improved channel opening for minimizing face plugging due to ash while maintaining good emissions conversion.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. Upon exiting the extruder in an axial direction, the batch stiffens into a wet extrudate comprising a network of axially extending intersecting walls (webs) that form axially extending channels and an axially extending outer peripheral surface. The webs and channels comprise the matrix. Disposed at the outer periphery of the matrix is the outer peripheral surface. The outer peripheral surface may be referred to herein as a co-extruded skin, an integrally formed co-extruded skin, or skin. A green ware honeycomb body or porous ceramic honeycomb body extruded with the skin on the matrix is referred to herein as an extrude-to-shape honeycomb body. As used herein a ceramic honeycomb body includes ceramic honeycomb monoliths and ceramic segmented honeycomb bodies.

A co-extruded or an after-applied exterior skin may form an outer peripheral surface extending axially from a first end face to a second end face of the ceramic honeycomb body. Each channel of the honeycomb body defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, as wall-flow filters, as partial filters, and as combinations thereof for cleaning fluids such as purifying engine exhausts.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

Ceramic honeycomb bodies may be disposed in a housing (can) in an exhaust system. The housing may be referred to as a can and the process of disposing the ceramic honeycomb body in the can may be referred to as canning. A ceramic honeycomb body disposed in a can may be referred to as canned.

Figure 1:
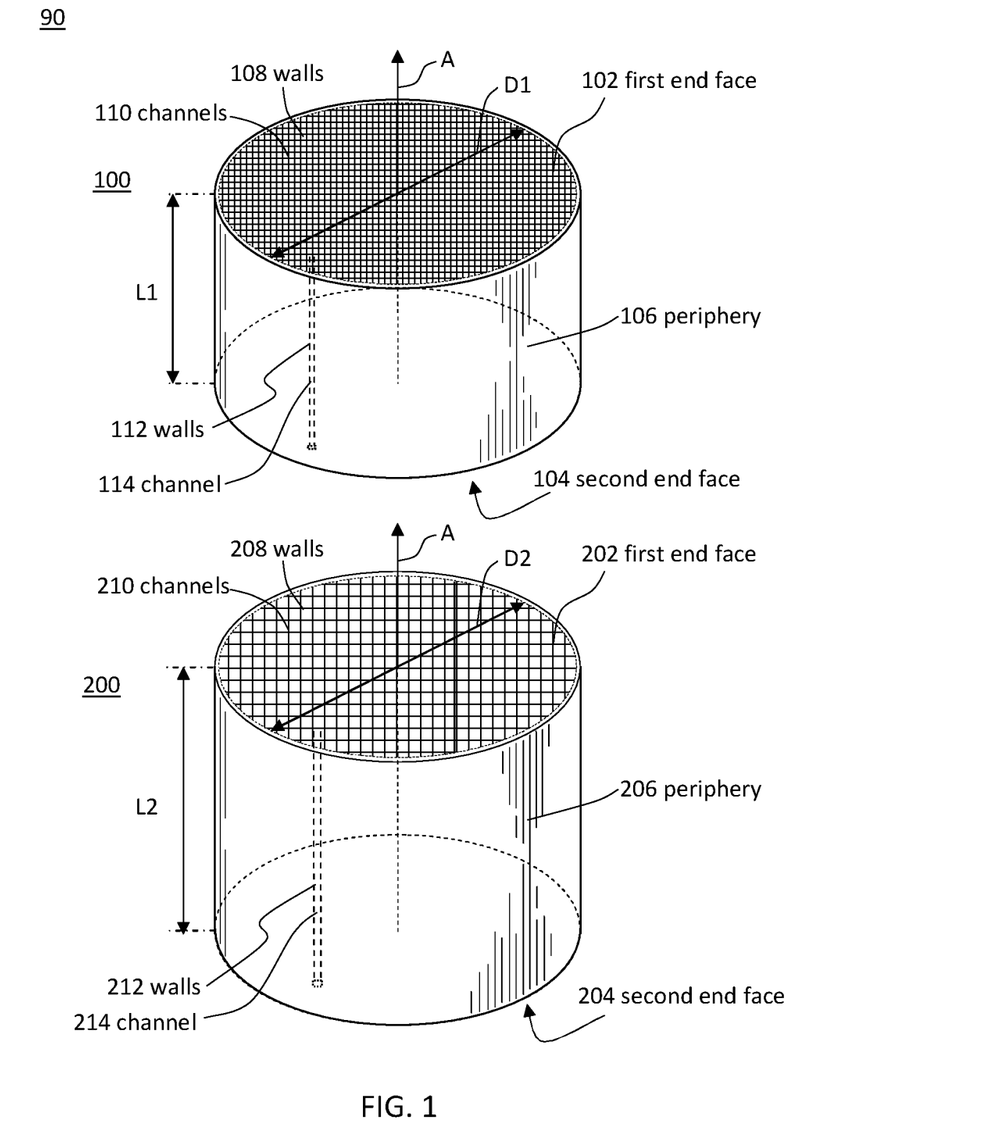
FIG. 1 illustrates a schematic compound honeycomb body having a first honeycomb section and a second honeycomb section according to exemplary embodiments of the disclosure.

FIG. 1 illustrates a schematic compound honeycomb body 90 having a first honeycomb section 100 and a second honeycomb section 200 according to exemplary embodiments of the disclosure. The compound honeycomb body 90 can comprise catalyzed first and second sections 100, 200. The first honeycomb section 100 has a length L1, volume V1, and includes a first end face 102 and a second end face 104 having an outer peripheral surface 106 extending from the first end face 102 to the second end face 104. A plurality of intersecting walls 108 that form mutually adjoining channels 110 extending in the axial direction "A" between opposing end faces 102, 104, according to exemplary embodiments of the disclosure, form a honeycomb matrix. Intersecting walls 112 forming a channel 114 extending between the end faces 102, 104 are shown for illustration. The axial direction is indicated by arrow "A" and a maximum cross sectional dimension perpendicular to the axial direction is indicated by "D1". For example, when the first honeycomb section 100 is a cylinder shape, the maximum dimension "D1" may be a diameter of an end face. For example, when the first honeycomb section cross section perpendicular to the axial direction is a rectangular shape, the maximum dimension "D1" may be a diagonal of an end face. The top face 102 refers to the first end face 102 and the bottom face 104 refers to the second end face 104 of the first honeycomb section 100 positioned in FIG. 1, otherwise the end faces are not limited by the orientation of the first honeycomb section 100. The top face 102 may be an inlet face and the bottom face 104 may be an outlet face of the first honeycomb section 100. The outer peripheral surface 106 of the first honeycomb section 100 extends axially from the first end face 102 to the second end face 104.

Cell density of the first honeycomb section 100 can be between about 100 and 1200 cells per square inch (cpsi). Typical cell wall thicknesses can range from about 0.025 mm to about 1.5 mm (about 1 to 60 mil). For example, first honeycomb section 100 geometries may be 400 cpsi with a wall thickness of about 8 mil (400/8) or with a wall thickness of about 6 mil (400/6). Other geometries include, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. As used herein, first honeycomb section 100 is intended to include a generally honeycomb structure but is not strictly limited to a square structure. For example, hexagonal, octagonal, triangular, rectangular or any other suitable cell shape may be used. Also, while the cross section of the cellular first honeycomb section 100 is circular, it is not so limited, for example, the cross section can be elliptical, square, rectangular, or other desired shape, and a combination thereof.

The second honeycomb section 200 has a length L2, volume V2, and includes a first end face 202 and a second end face 204 having an outer peripheral surface 206 extending from the first end face 202 to the second end face 204. A plurality of intersecting walls 208 that form mutually adjoining channels 210 extending in the axial direction "A" between opposing end faces 202, 204, according to exemplary embodiments of the disclosure, form the honeycomb matrix. Intersecting walls 212 forming a channel 214 extending between the end faces 202, 204 are shown for illustration. The axial direction is indicated by arrow "A" and a maximum cross sectional dimension perpendicular to the axial direction is indicated by "D2". For example, when the second honeycomb section is a cylinder shape, the maximum dimension "D2" may be a diameter of an end face. For example, when the second honeycomb section cross section perpendicular to the axial direction is a rectangular shape, the maximum dimension "D2" may be a diagonal of an end face. The top face 202 refers to the first end face 202 and the bottom face 204 refers to the second end face 204 of the second honeycomb section 200 positioned in FIG. 1, otherwise the end faces are not limited by the orientation of the second honeycomb section 200. The top face 202 may be an inlet face and the bottom face 204 may be an outlet face of the second honeycomb section 200. The outer peripheral surface 206 of the second honeycomb section 200 extends axially from the first end face 202 to the second end face 204.

Cell density of the second honeycomb section 200 can be between about 100 and 1200 cells per square inch (cpsi). Typical cell wall thicknesses can range from about 0.025 mm to about 1.5 mm (about 1 to 60 mil). For example, second honeycomb section 200 geometries may be 400 cpsi with a wall thickness of about 8 mil (400/8) or with a wall thickness of about 6 mil (400/6). Other geometries include, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. As used herein, second honeycomb section 200 is intended to include a generally honeycomb structure but is not strictly limited to a square structure. For example, hexagonal, octagonal, triangular, rectangular or any other suitable cell shape may be used. Also, while the cross section of the cellular second honeycomb section 200 is circular, it is not so limited, for example, the cross section can be elliptical, square, rectangular, or other desired shape, and a combination thereof.

The compound honeycomb body 90 having a length L comprises the first honeycomb section 100 of length L1, volume V1, and the second honeycomb section 200 of L2, volume V2. The first honeycomb section 100 comprises the high-porosity substrate and the second honeycomb section 200 comprises the standard substrate. The first honeycomb section 100 can comprise the high-porosity substrate and the second honeycomb section 200 can comprise the high-porosity substrate having a higher mass than the first honeycomb section, such as through lower porosity or having end plugs. The second honeycomb section 200 is fluidly connected to the first honeycomb section 100. The honeycomb sections 100, 200 fluidly connected refers to fluid, such as exhaust gas, that flows through the first honeycomb section 100, for example, from an inlet 102 to an outlet 104, then flows through the second honeycomb section 200, for example, from an inlet 202 to an outlet 204.

Figure 2:
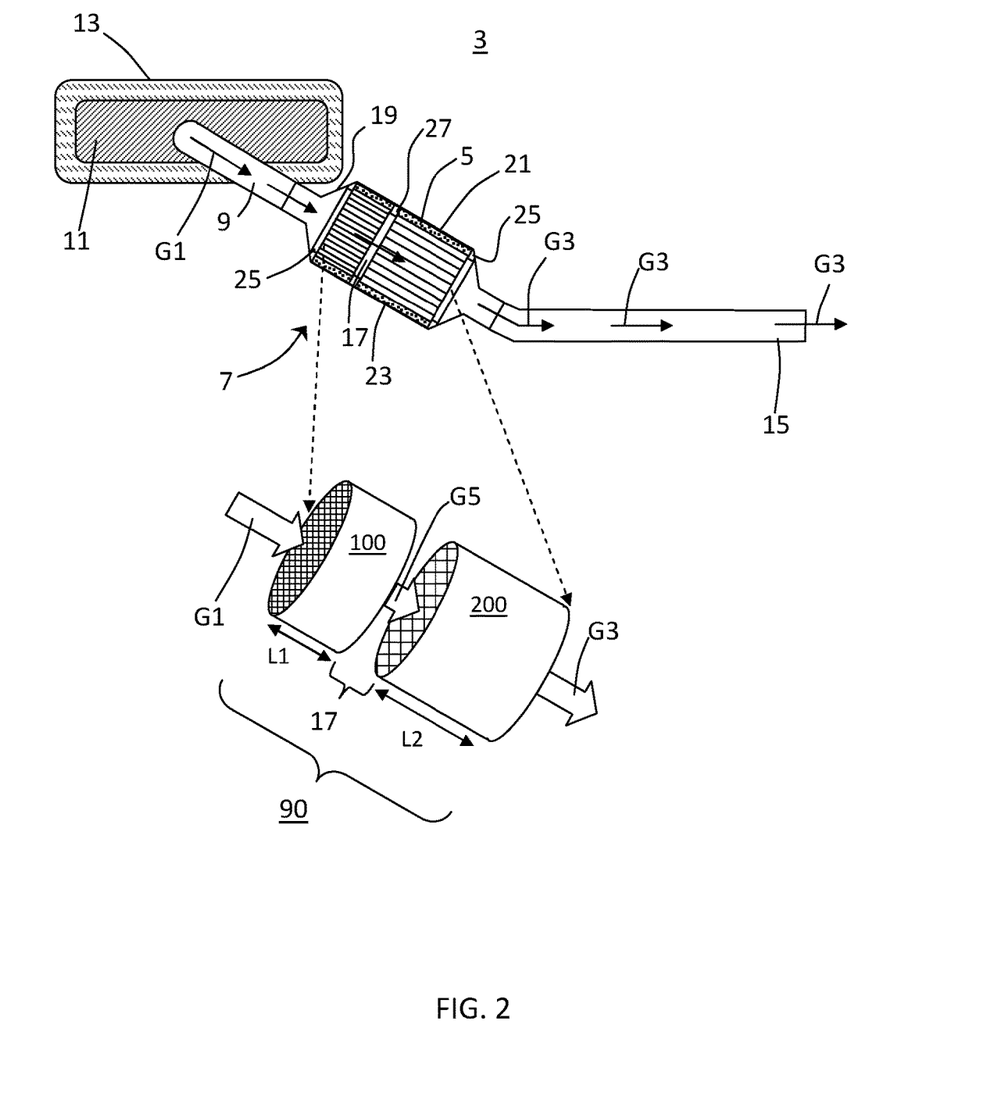
FIG. 2 presents a schematic of an exhaust system comprising a compound honeycomb body disposed in a housing, wherein the compound honeycomb body comprises a first honeycomb section and a second honeycomb section according to exemplary embodiments of the disclosure.

FIG. 2 presents a schematic of an exhaust system 3 comprising a compound honeycomb body 90 disposed in a housing 5, wherein the compound honeycomb body 90 comprises the first honeycomb section 100 and the second honeycomb section 200 according to exemplary embodiments of the disclosure. The exhaust system 3 can comprise an exhaust treatment article 7 comprising the compound honeycomb body 90 disposed in the housing 5, an inlet 9 configured to accept an exhaust gas stream G1 to be purified, for example, from a manifold 11 of an engine 13, and an outlet 15 configured to emit the purified exhaust gas stream G3. The exhaust gas treatment article 7 is configured to flow the exhaust gas stream G1 through the compound honeycomb body 90 to purify the exhaust gas stream G1. The exhaust gas G1 flows through the first honeycomb section 100 and then through the second honeycomb section 200. The exhaust gas G1 may flow out of the first honeycomb section 100 into a gap 17 the exhaust gas G5 in the gap 17 may then flow into the second honeycomb section 200. The gap 17 can be in a range from about 0 to about 120 cm. For example, the gap can be in a range from about 0 to 50 mm.

The channels 110 of the first honeycomb section 100 can be axially aligned with the channels 210 of the second honeycomb section 200, but need not be. The diameter D1 of the first honeycomb section 100 can be the same as the diameter D2 of the second honeycomb section 200, but also does not have to be.

The first honeycomb section 100 and the second honeycomb section 200 can be mounted in one housing 5. The housing 5 can have tapered inlet and outlet sections 19 and an axial section 21 covering the outer peripheral surfaces 106, 206 of the first and second honeycomb sections 100, 200. The housing 5 is generally fabricated of metal or other material that is impermeable to gases, and is configured to contain one or more honeycomb bodies 100, 200. For example, the housing 5 can comprise aluminum, stainless steel such as 400-series stainless steel or 300-series stainless steel, titanium alloy, titanium, and the like, and combinations thereof. Exhaust gases flow through the first and second honeycomb sections 100, 200 in the general axial direction as indicated by arrows G1, G3, and G5, including through the channels 112, 212 that may or may not be catalyzed, and in the case of filters, through the channel walls 110, 210. A mat 23 can be disposed around the honeycomb sections 100, 200 to minimize the effects of vibration and movement, and provide a thermal barrier between the housing 5 and the honeycomb sections 100, 200. However, in some exemplary embodiments the honeycomb sections 100, 200 can be disposed in the housing 5 without a mat.

Examples of a honeycomb body mounted in a housing are provided in U.S. Provisional Patent Application having Ser. No. 62/136,917, titled Exhaust Gas Treatment Article and Methods of Manufacturing Same, filed on Mar. 23, 2015, U.S. Provisional Patent Application having Ser. No. 62/158,813, titled Housing, Fluid Stream Treatment Article, Exhaust System and Methods of Manufacturing Same, filed on May 8, 2015, and U.S. Provisional Patent Application having Ser. No. 62/132,569, titled Honeycomb Assembly and Packaging System, filed on Mar. 13, 2015, all of which are hereby incorporated by reference in their entireties as if fully set forth herein.

Mounting rings 25 on an inside surface of the housing 5 can hold the honeycomb sections 100, 200 in the housing 5. A mounting ring 27 disposed between honeycomb sections 100, 200 can space the second end face 104 of the first honeycomb section 100 from the first end face 202 of the second honeycomb section 200 defining the gap 17. However, in some exemplary embodiments there may be no gap 17.

Figure 3:
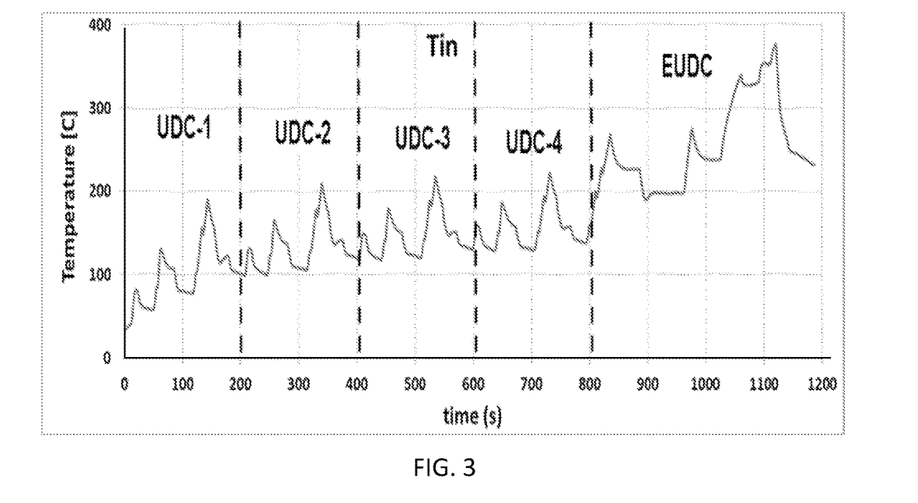
FIG. 3 shows that during a New European Driving Cycle (NEDC) test cycle consisting of four repeated ECE-15 urban driving cycles (UDC) and one Extra-Urban driving cycle (EUDC) typical exhaust temperatures for a diesel engine are fairly low (for example, less than about 200° C.) for most of the test.

FIG. 3 shows that during a New European Driving Cycle (NEDC) test cycle consisting of four repeated ECE-15 urban driving cycles (UDC) and one Extra-Urban driving cycle (EUDC) typical exhaust temperatures for a diesel engine are fairly low for most of the test, for example, less than about 200° C. Due to these low temperatures for much of the cycle and during the several transients, the catalyst can cool down below the light-off temperature.

Figure 4:
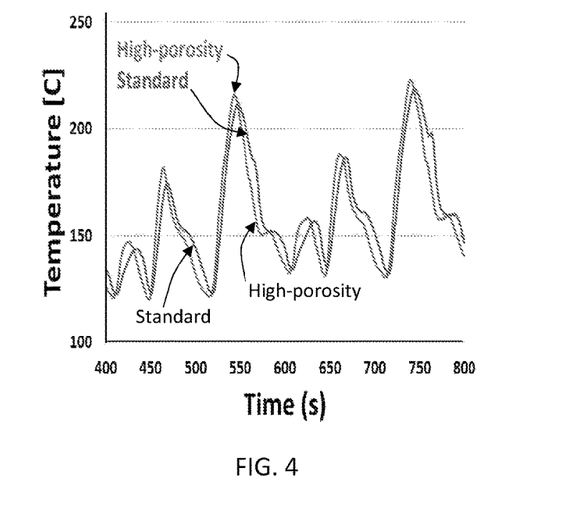
FIG. 4 is a calculated thermal response of high-porosity (FLORA™) and standard substrates. The high-porosity substrate heats up and cools down faster than the standard substrate. Only a portion of the NEDC cycle is shown for clarity.

FIG. 4 is a calculated thermal response of a high-porosity (FLORA™) substrate and a standard substrate. The high-porosity substrate heats up and cools down faster than the standard substrate. Only a portion of the NEDC cycle is shown for clarity. As shown in FIG. 4, under such conditions, the high-porosity substrate heats up more quickly as the exhaust gas temperature rises, but also cools off more quickly as the exhaust gas temperature decreases. This can surprisingly result in a decline of the emissions conversion performance.

Figure 5:
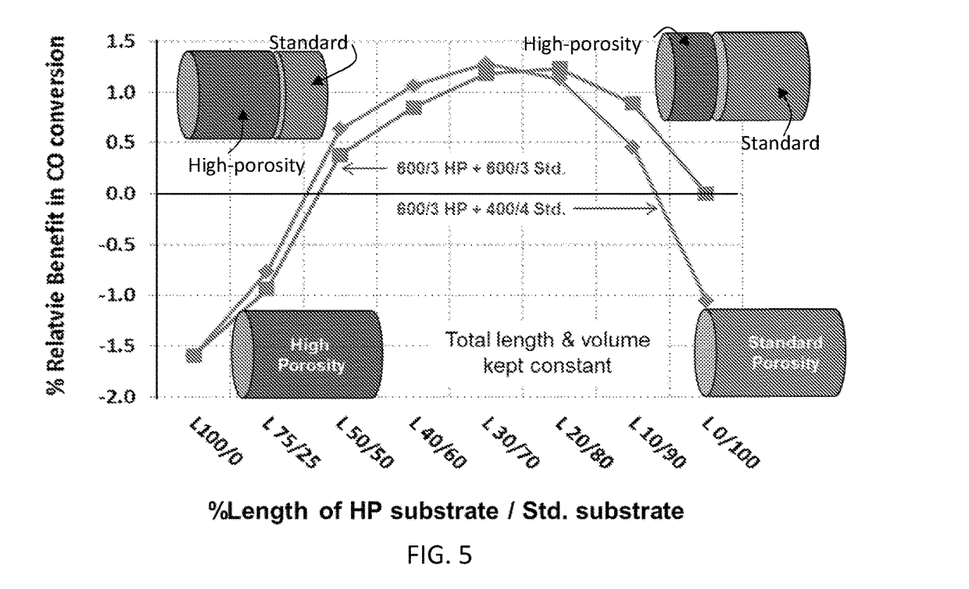
FIG. 5 is a graph of calculated percent relative benefit in CO conversion for a high-porosity substrate, a compound substrate of a high-porosity section and a downstream standard section at various proportional lengths of high-porosity to standard according to exemplary embodiments of the disclosure, and a standard substrate.

FIG. 5 is a graph of calculated percent relative benefit in CO conversion for a high-porosity substrate, a compound substrate of a high-porosity section and a downstream standard section at various proportional lengths of high-porosity to standard according to exemplary embodiments of the disclosure, and a standard substrate. The compound substrate having a combination of about 30% in length high-porosity substrate followed by a downstream about 70% in length standard substrate is superior in percent relative benefit in CO conversion to that of either the standard or the high-porosity substrates alone. While described in terms of length, it will be understood, that the compound substrate can be described as having a combination of about 30% in volume high-porosity substrate followed by a downstream about 70% in volume standard substrate being superior in percent relative benefit in CO conversion to that of either the standard or the high-porosity substrates alone. In FIG. 5, the high-porosity substrate having a 600/3 geometry shown as 100% L1 (L100/0) has a percent relative benefit in CO conversion less than −1.5 compared to a 600/3 standard substrate. That is, the high-porosity substrate leads to worse performance and increased cumulative CO emissions compared to the standard porosity substrate.

In FIG. 5, the compound honeycomb body 90 comprises the first honeycomb section 100 of length L1, volume V1 of high-porosity substrate having 600/3 geometry and the second honeycomb section 200 of length L2, volume V2 of standard substrate 600/3 or 400/4 geometry. That is, the second honeycomb section 200 comprises a heavier substrate by either lower porosity and/or thicker walls than the first honeycomb section 100. Alternatively or in addition, the second honeycomb section 200 can have plugs to plug channels forming a filter or partial filter to provide a higher thermal mass than the first honeycomb section 100. Surprisingly, for the compound honeycomb body 90 when L1/L2 is between 50/50 and 10/90, the compound honeycomb body 90 has a percent relative benefit in CO conversion of about 0.5 to about 1.3. In particular, when L1/L2 is 30/70 or 20/80, the percent relative benefit in CO conversion is greater than 1.0. The total length and volume was kept constant for the calculations shown in FIG. 5. For the same total length and volume, it is seen that a 30% length high-porosity substrate followed by 70% length low-porosity substrate leads to the best overall performance. Likewise, for the compound honeycomb body 90 when V1/V2 is between 50/50 and 10/90, the compound honeycomb body 90 has a percent relative benefit in CO conversion of about 0.5 to about 1.3. In particular, when V1/V2 is 30/70 or 20/80, the percent relative benefit in CO conversion is greater than 1.0. For the same total length and volume, a 30% volume low mass substrate followed by 70% volume high mass substrate leads to the best overall performance.

Figure 6:
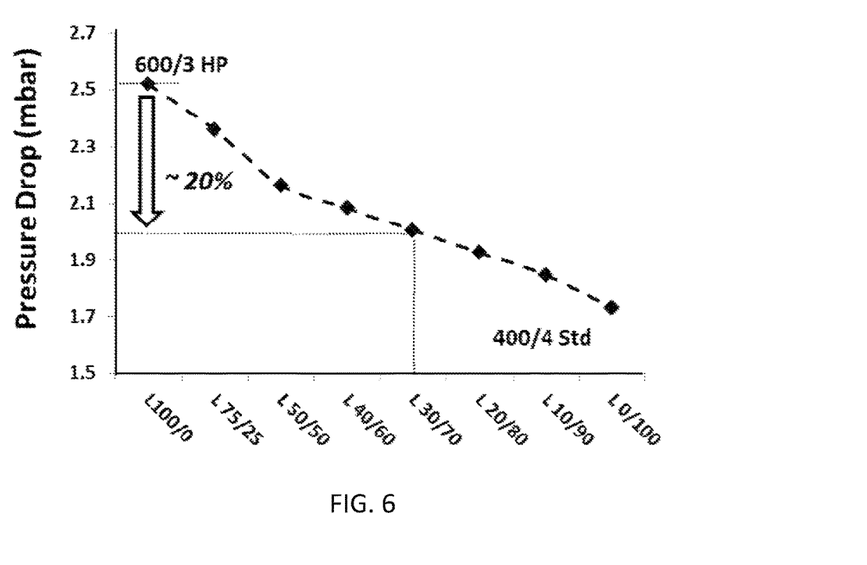
FIG. 6 shows a calculated pressure drop for a high-porosity substrate, a compound substrate of a high-porosity section and a downstream standard section at various proportional lengths of high-porosity to standard according to exemplary embodiments of the disclosure, and a standard substrate.

FIG. 6 shows a calculated pressure drop for a high-porosity substrate, a compound substrate of a high-porosity section and a downstream standard section at various proportional lengths of high-porosity to standard according to exemplary embodiments of the disclosure, and a standard substrate. Surprisingly, the compound honeycomb body 90 of FIG. 5 also has a significant pressure drop for L1/L2 between 50/50 and 10/90, in particular, when L1/L2 is 30/70, the pressure drop is about 20% less than the 100% L1 (L100/0) or high-porosity substrate alone as shown in FIG. 6. The significant pressure drop can also be expressed as V1/V2 between 50/50 and 10/90, in particular, when V1/V2 is 30/70, the pressure drop is about 20% less than high-porosity substrate alone.

Figure 7:
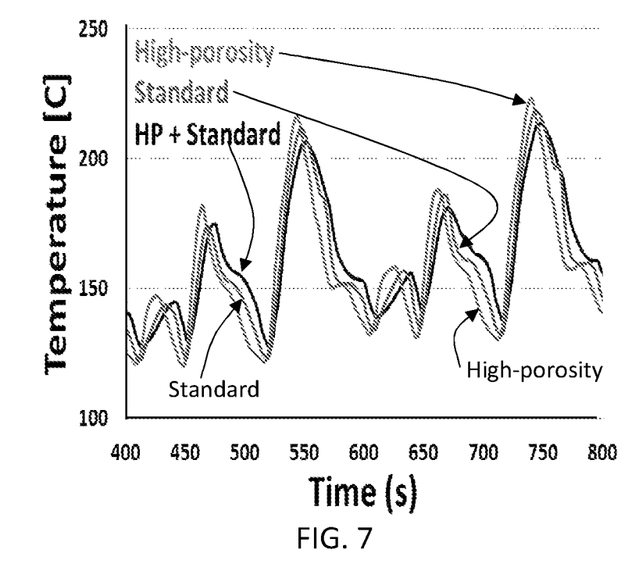
FIG. 7 is a calculated thermal response of the high-porosity substrate, a compound substrate of a high-porosity section and a downstream standard section according to exemplary embodiments of the disclosure, and a standard substrate designs 10 mm from the outlet.

FIG. 7 is a calculated thermal response of the high-porosity substrate, the compound substrate of a high-porosity section and a downstream standard section according to exemplary embodiments of the disclosure, and the standard substrate designs 10 mm from the outlet. The temperatures are shown in the downstream (standard) substrate. Surprisingly, the compound substrate heats up similar to the standard substrate, but retains the heat significantly longer than either the standard or high-porosity substrate alone during cool-down portions of the drive cycle.

Figure 8:
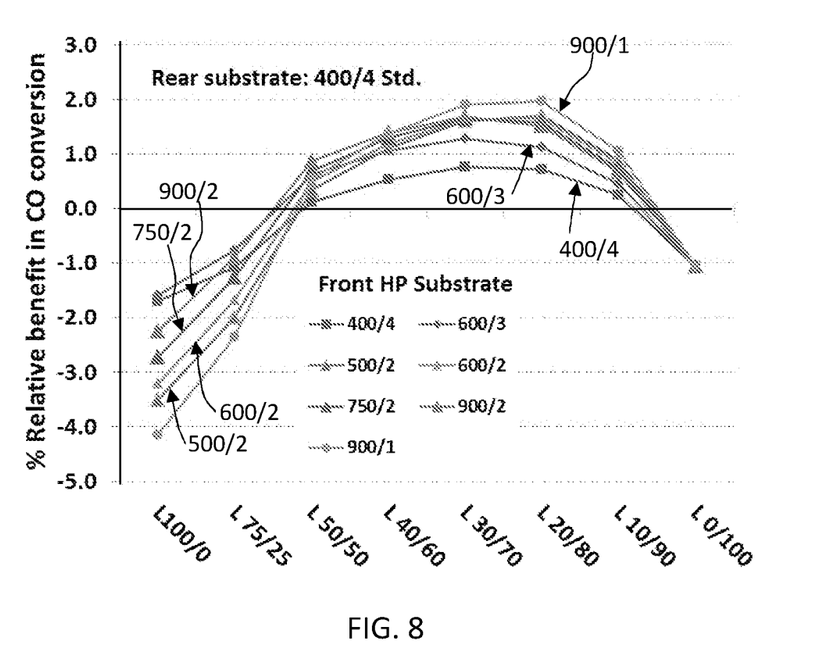
FIG. 8 is a graph of calculated percent relative benefit in CO conversion for a high-porosity substrate as a function of the cell density and wall thickness (design) and a compound substrate of a high-porosity section and a downstream standard section at various proportional lengths of high-porosity to standard as a function of the upstream high-porosity section design according to exemplary embodiments of the disclosure, and a standard substrate.

FIG. 8 is a graph of calculated percent relative benefit in CO conversion for a high-porosity substrate as a function of the cell density and wall thickness (design) and a compound substrate of a high-porosity section and a downstream standard section at various proportional lengths of high-porosity to standard as a function of the upstream high-porosity section design according to exemplary embodiments of the disclosure, and a standard substrate. The high-porosity substrates regardless of geometry, i.e., 400/4, 500/2, 750/2, 900/1, 600/3, 600/2, and 900/2 shown as 100% L1 (L100/0) have percent relative benefit in CO conversion less than −1.5 compared to a 600/3 standard substrate. That is, the high-porosity substrate leads to worse performance and increased cumulative CO emissions compared to the standard porosity substrate. Also, the 400/4 standard substrate has a percent relative benefit in CO conversion less than −1 compared to the 600/3 standard substrate.

The compound honeycomb body 90 comprises the first honeycomb section 100 of length L1, volume V1 of high-porosity substrate having 400/4, 500/2, 750/2, 900/1, 600/3, 600/2, or 900/2 geometry and the second honeycomb section 200 of length L2, volume V2 of standard substrate 400/4 geometry. That is, the second honeycomb section 200 comprises a heavier substrate by either lower porosity and/or thicker walls than the first honeycomb section 100. Surprisingly, for the compound honeycomb body 90 when L1/L2 is between 50/50 and 10/90, for all of these high-porosity geometries 400/4, 500/2, 750/2, 900/1, 600/3, 600/2, and 900/2, the compound honeycomb body 90 has a percent relative benefit in CO conversion over the 600/3 standard substrate. In particular, when L1/L2 is 30/70 or 20/80, the percent relative benefit in CO conversion is greater than 1.0 for the compound honeycomb body 90 having the first honeycomb section 100 of length L1 of high-porosity substrate having 500/2, 750/2, 900/1, 600/3, 600/2, or 900/2 geometry and the second honeycomb body section 200 of length L2 of standard substrate having 400/4 geometry. The total length and volume was kept constant for the calculations shown in FIG. 8. For the same total length and volume, it is seen that either a 30% length high-porosity substrate followed by 70% length low-porosity substrate or a 20% length high-porosity substrate followed by 80% length low-porosity substrate leads to the best overall performance. Furthermore, the percent relative benefit in CO conversion increases with increasing geometric surface area (GSA)/bulk density.

The percent relative benefit in CO conversion over the 600/3 standard substrate for the compound honeycomb body 90 can also be expressed for when V1/V2 is between 50/50 and 10/90, for these high-porosity geometries 400/4, 500/2, 750/2, 900/1, 600/3, 600/2, and 900/2. In particular, when V1/V2 is 30/70 or 20/80, the percent relative benefit in CO conversion is greater than 1.0 for the compound honeycomb body 90 having the first honeycomb section 100 of volume V1 of high-porosity substrate having 500/2, 750/2, 900/1, 600/3, 600/2, or 900/2 geometry and the second honeycomb body section 200 of volume V2 of standard substrate having 400/4 geometry. For the same total length and volume, either a 30% volume high-porosity substrate followed by 70% volume low-porosity substrate or a 20% volume high-porosity substrate followed by 80% volume low-porosity substrate leads to the best overall performance.

Figure 9:
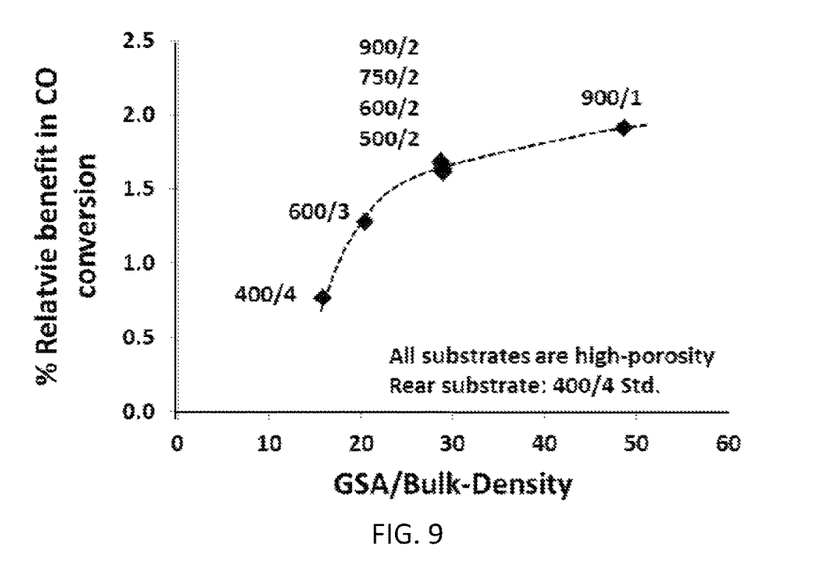
FIG. 9 shows the advantage in calculated percent relative benefit in CO conversion increases with increase in geometric surface area/bulk density of the high-porosity section of the compound substrate of a high-porosity section and a downstream standard section at 30/70 proportional lengths of high-porosity to standard according to exemplary embodiments of the disclosure.

FIG. 9 shows the advantage in calculated percent relative benefit in CO conversion increases with increase in GSA/bulk density of the high-porosity section of the compound substrate of the high-porosity section and the downstream standard section at L1/L2 of 30/70 proportional lengths (V1/V2 of 30/70 proportional volumes) of high-porosity to standard according to exemplary embodiments of the disclosure.

Figure 10:
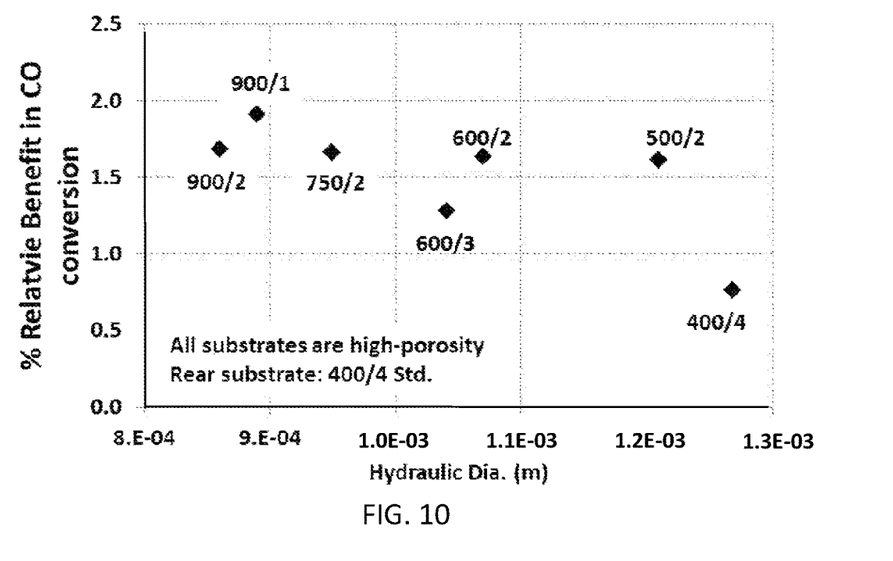
FIG. 10 shows the advantage in calculated percent relative benefit in CO conversion as a function of the channel opening of the high-porosity section of the compound substrate at 30/70 proportional lengths of high-porosity to standard according to exemplary embodiments of the disclosure.

FIG. 10 shows the advantage in calculated percent relative benefit in CO conversion as a function of the channel opening of the high-porosity section of the compound substrate at L1/L2 of 30/70 proportional lengths (V1/V2 of 30/70 proportional volumes) of high-porosity to standard according to exemplary embodiments of the disclosure. The benefit in CO conversion is shown for the various first honeycomb section 100 geometries of 400/4, 500/2, 750/2, 900/1, 600/3, 600/2, and 900/2 with the 400/4 geometry standard substrate second honeycomb section 200. A larger channel opening is preferred for diesel applications to lower the propensity for face plugging due to ash. In FIG. 10, the propensity for ash plugging is assumed to be inversely proportional to the channel opening. Accordingly, the compound honeycomb body 90 comprising the first honeycomb section 100 of length L1 of high-porosity substrate having 500/2 geometry and the second honeycomb section 200 of length L2 of standard substrate 400/4 geometry, where L1/L2 is 30/70 to 20/80 may be a preferred selection to achieve a higher percent relative benefit in CO conversion and maintain a relatively large channel opening for diesel applications. Likewise, the preferred selection to achieve a higher percent relative benefit in CO conversion and maintain a relatively large channel opening for diesel applications can be expressed as the compound honeycomb body 90 comprising the first honeycomb section 100 of volume V1 of high-porosity substrate having 500/2 geometry and the second honeycomb section 200 of volume V2 of standard substrate 400/4 geometry, where V1/V2 is 30/70 to 20/80.

It has been demonstrated herein that the use of a low thermal mass substrate such as FLORA™ substrate or a thin-wall substrate followed by a standard substrate having high thermal mass and/or thick-wall according to exemplary embodiments of the disclosure provides better emissions performance than the use of a low thermal mass or standard substrate alone. It was surprisingly determined that the ratio of lengths or volumes of the low thermal mass/standard substrate at ~30%-70% provided particular improvements. The advantage was also demonstrated to increase with a move to advantaged products, with higher ration of GSA/density, for example, thin-wall products. The combination in the compound honeycomb body also provides lower pressure drop penalty compared to the use of a single high cell density product. Further, it was surprisingly found as described herein that a preferred product cell density/wall thickness of the upstream substrate is advantageous from a perspective of minimizing face plugging due to ash while also maintaining high CO conversion according to these exemplary embodiments of the disclosure.

Advantages of the improved exhaust gas treatment article including a compound honeycomb body, and an exhaust system comprised thereof include a performance advantage in terms of reduced tailpipe emissions as compared to those using low thermal mass or standard substrates alone according to exemplary embodiments of the disclosure. The combination of a low thermal mass light-off substrate followed by a standard porosity substrate can be expected to deliver better performance. Early light-off due to the low thermal mass substrate and slower cool-down due to heat being retained longer in the standard porosity substrate can be achieved. The advantages due to exemplary embodiments of the disclosure described herein can lead to higher average substrate temperatures across the drive cycle and lead to higher catalytic activity and lower emissions. The emissions advantage could be used to meet tightening regulations or could be used to reduce the precious metal loading to achieve similar emissions as the standard substrate arrangement, thereby reducing the system cost. When the downstream honeycomb section substrate is one with lower cell density, then exemplary embodiments of the disclosure also lead to lower pressure drop when compared to using a high cell density product (substrate) alone. One of the disadvantages of high cell density products for diesel applications is the propensity of these substrates to face plugging due to ash. Exemplary embodiments of the disclosure show an unexpected advantage for choosing the upstream substrate which minimizes face plugging while maintaining high CO conversion. These exemplary embodiments of the disclosure demonstrate the advantages of using FLORA™ substrates for diesel applications, such as diesel oxidation catalyst (DOC) or other low-temperature application where there is increased possibility of catalyst light-out.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A compound honeycomb body, comprising:
    a first honeycomb section extending axially a distance L1, comprising
        a plurality of porous ceramic channel walls extending axially from opposing first and second end faces defining cell channels therebetween, and an outer peripheral surface extending axially, wherein the cell channels of the first honeycomb section are not plugged; and
    a second honeycomb section fluidly connected to the first honeycomb section extending a distance L2, comprising
        a plurality of porous ceramic channel walls extending axially from opposing first and second end faces defining cell channels therebetween, and an outer peripheral surface extending axially,
    wherein the thermal mass of the second honeycomb section is greater than the thermal mass of the first honeycomb section,
    wherein L1/L2 comprises a ratio in a range from about 50/50 to about 10/90, and
    wherein porosity (% P) of the porous ceramic channel walls of the first honeycomb section is greater than or equal to 55% and porosity (% P) of the porous ceramic channel walls of the second honeycomb section is less than 45%.

2. The body of claim 1, wherein L1/L2 comprises a ratio in a range from about 40/60 to about 20/80.

3. The body of claim 1, wherein porosity (% P) of the porous ceramic channel walls of the second honeycomb section is less than 40%.

4. the body of claim 1, wherein porosity (%P) of th porous ceramic channel walls of the first honeycomb section is greater than or equal to 55%.

5. The body of claim 1, wherein the first honeycomb section comprises a first catalyst and the second honeycomb section comprises a second catalyst.

6. The body of claim 1, wherein the first honeycomb section comprises a cell channel density in a range from about 200 cells per square inch (cpsi) to about 1200 cpsi.

7. The body of claim 6, wherein the second honeycomb section comprises a cell channel density in a range from about 200 cells per square inch (cpsi) to about 1200 cpsi.

8. The body of claim 1, wherein the first honeycomb section comprises a wall thickness in a range from about 1 mil to about 9 mil.

9. The body of claim 8, wherein the second honeycomb section comprises a wall thickness in a range from about 1 mil to about 60 mil.

10. The compound honeycomb body of claim 8, wherein the wall thickness of the second honeycomb section is in a range from about 3 mil to about 5 mil.

11. The body of claim 1, wherein the second honeycomb section comprises a wall thickness in a range from about 1 mil to about 9 mil.

12. The body of claim 1, wherein the first honeycomb section comprises a cell channel density of about 500 cells per square inch (cpsi) and a wall thickness of about 2 mil, and wherein the second honeycomb section comprises a cell channel density of in a range from about 400 cpsi to about 600 cpsi and a wall thickness in a range from about 3 mil to about 5 mil.

13. The compound honeycomb body of claim 1, wherein the second honeycomb section comprises a plugging cement disposed in a channel to plug the channel.

14. A compound honeycomb body, comprising:
a first honeycomb section having a volume V1, comprising
a plurality of porous ceramic channel walls extending axially from opposing first and second end faces defining cell channels therebetween, and an outer peripheral surface extending axially, wherein the cells channels of the first honeycomb section are not plugged; and
a second honeycomb section fluidly connected to the first honeycomb section having a volume V2, comprising
a plurality of porous ceramic channel walls extending axially from opposing first and second end faces defining cell channels therebetween, and an outer peripheral surface extending axially,
wherein the thermal mass of the second honeycomb section is greater than the thermal mass of the first honeycomb section,
wherein V1/V2 comprises a ratio in a range from about 50/50 to about 10/90, and
wherein porosity (% P) of the porous ceramic channel walls of the first honeycomb section is greater than or equal to 55% porosity (% P) of the porous ceramic channel walls of the second honeycomb section is less than 45%.

15. The body of claim 14, wherein porosity (%P) of the porous ceramic channel walls of the first honeycombe section is greater than of qeual to 55%.

16. The compound honeycomb body of claim 14, wherein the second honeycomb section comprises a plugging cement disposed in a channel to plug the channel.

17. The compound honeycomb body of claim 14, wherein a wall thickness of the second honeycomb section is in a range from about 3 mil to about 5 mil.

18. An exhaust gas treatment article, comprising:
a compound honeycomb body comprising
a first honeycomb section having a volume V1, comprising
a plurality of porous ceramic channel walls extending axially from opposing first and second end faces defining cell channels therebetween, and an outer peripheral surface extending axially, wherein the cell channels of the first honeycomb section are not plugged; and
a second honeycomb section fluidly connected to the first honeycomb section having a volume V2, comprising
a plurality of porous ceramic channel walls extending axially from opposing first and second end faces defining cell channels therebetween, and an outer peripheral surface extending axially,
wherein the thermal mass of the second honeycomb section is greater than the thermal mass of the first honeycomb section, and
wherein V1/V2 comprises a ratio in a range from about 50/50 to about 10/90;
a housing configured to mount the compound honeycomb body,
wherein the compound honeycomb body is disposed in a space defined by an inner surface of the housing, and
wherein porosity (% P) of the porous ceramic channel walls of the first honeycomb section is greater than or equal to 55% and porosity (% P) of the porous ceramic channel walls of the second honeycomb section is less than 45%.

19. The article of claim 18, wherein V1/V2 comprises a ratio in a range from about 40/60 to about 20/80.

20. The article of claim 18, wherein porosity (% P) of the porous ceramic channel walls of the second honeycomb section is less than 40%.

21. The article of claim 18, wherein porosity (%P) of the porous ceramic channel walls of the fiorst honeycomb section is greater than or equal to 55%.

22. The article of claim 18, wherein the first honeycomb section comprises a wall thickness in a range from about 1 mil to about 9 mil.

23. The article of claim 22, wherein the second honeycomb section comprises a wall thickness in a range from about 1 mil to about 60 mil.

24. The article of claim 18, wherein the second honeycomb section comprises a wall thickness in a range from about 1 mil to about 9 mil.

25. The exhaust gas treatment article of claim 24, wherein the wall thickness of the second honeycomb section is in a range from about 3 mil to about 5 mil.

26. The exhaust gas treatment article of claim 18, wherein the second honeycomb section comprises a plugging cement disposed in a channel to plug the channel.

* * * * *

UNITED STATES PATENT AND TRADEMARK OFFICE
CERTIFICATE OF CORRECTION

PATENT NO. : 10,632,458 B2
APPLICATION NO. : 15/777085
DATED : April 28, 2020
INVENTOR(S) : Thorsten Rolf Boger et al.

It is certified that error appears in the above-identified patent and that said Letters Patent is hereby corrected as shown below:

In the Claims

In Column 15, Line 9, Claim 4, delete "the" and insert -- The --, therefor.

In Column 15, Line 9, Claim 4, delete "th" and insert -- the --, therefor.

In Column 16, Line 2, Claim 15, delete "honeycombe" and insert -- honeycomb --, therefor.

In Column 16, Line 2, Claim 15, delete "of qeual" and insert -- or equal --, therefor.

In Column 16, Line 49, Claim 15, delete "fiorst" and insert -- first --, therefor.

Signed and Sealed this
First Day of August, 2023

Katherine Kelly Vidal
*Director of the United States Patent and Trademark Office*